United States Patent [19]
Matsumoto et al.

[11] Patent Number: 5,443,780
[45] Date of Patent: Aug. 22, 1995

[54] ORIENTED FILMS OF POLYLACTIC ACID AND METHODS OF PRODUCING SAME

[75] Inventors: Kiyoichi Matsumoto, Kyoto; Shu Tahara, Shiga; Eiichi Ozeki, Kyoto; Makoto Ogaito, Kyoto; Masakazu Kobayashi, Kyoto, all of Japan

[73] Assignee: Shimadzu Corporation, Japan

[21] Appl. No.: 265,348

[22] Filed: Jun. 24, 1994

[51] Int. Cl.$^6$ .............................................. B29C 55/00
[52] U.S. Cl. .............................. 264/290.2; 264/176.1; 264/288.4; 264/288.8
[58] Field of Search .................. 264/288.8, 76.1, 290.2, 264/288.4; 528/361

[56] References Cited

U.S. PATENT DOCUMENTS 5,298,602  3/1994  Shikinami et al. .................. 528/361

*Primary Examiner*—Morton Foelak
*Attorney, Agent, or Firm*—Majestic, Parsons, Siebert & Hsue

[57] ABSTRACT

An oriented film with improved tensile strength and Young's modulus can be produced by melting and extruding poly-L-lactic acid and/or poly-D-lactic acid to form a film and, after the film is cooled rapidly, by subjecting it to a stretching process at a temperature above the glass transition temperature and below the cold-crystallization temperature. The stretching may be effected by a method of uniaxial stretching with constant width, successive biaxial stretching or simultaneous biaxial stretching. A thermal treatment may be effected after the stretching process. Films thus obtained have tensile strength over 6 kgf/mm$^2$ in the stretching direction, Young's modulus over 220 kgf/mm$^2$ in the stretching direction and transparency to visible light over 90%.

17 Claims, 6 Drawing Sheets

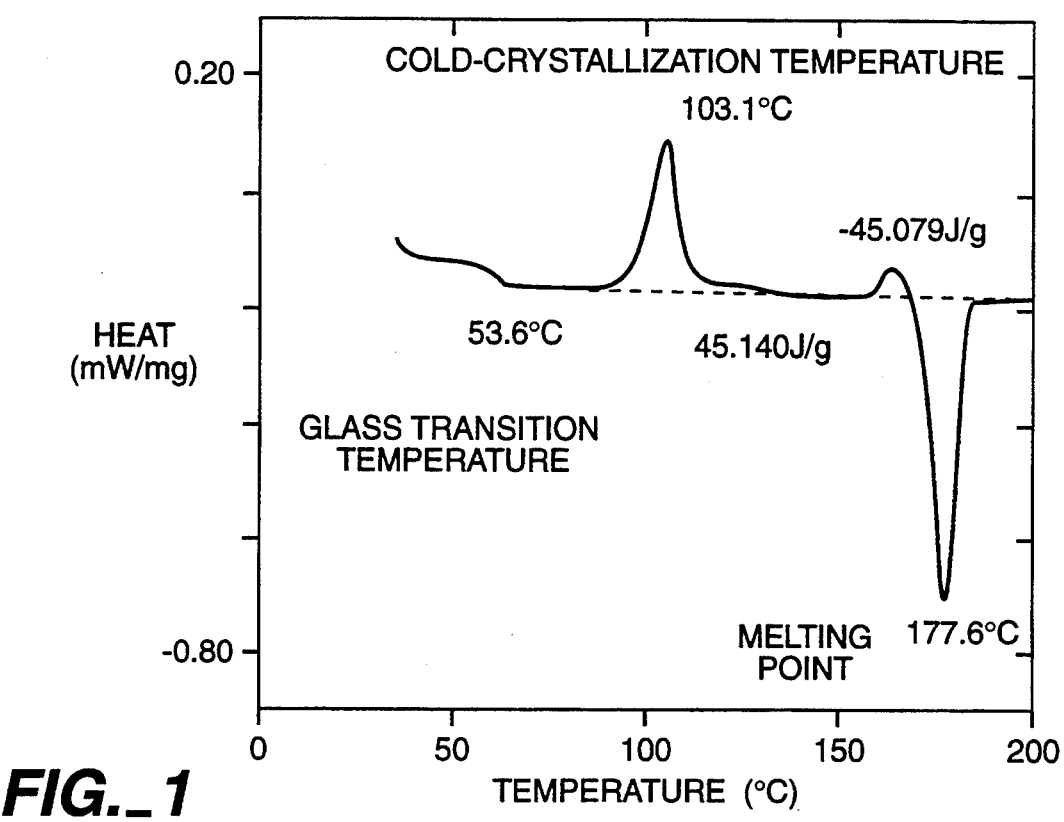
FIG._1
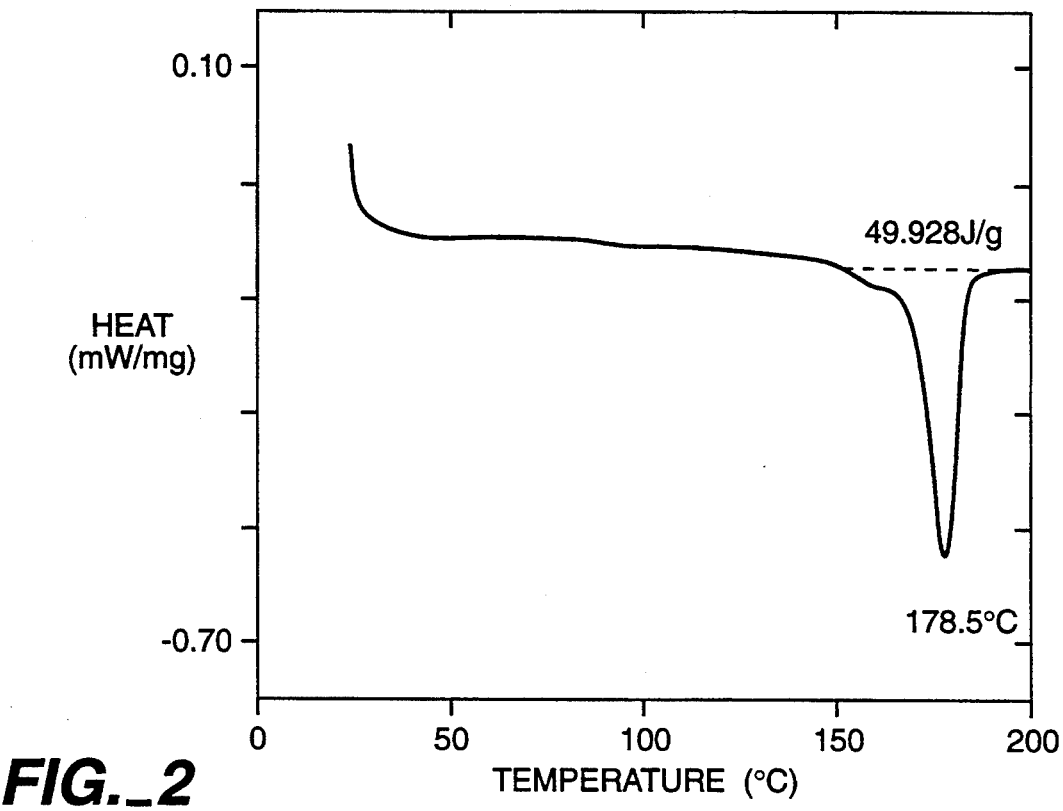
FIG._2

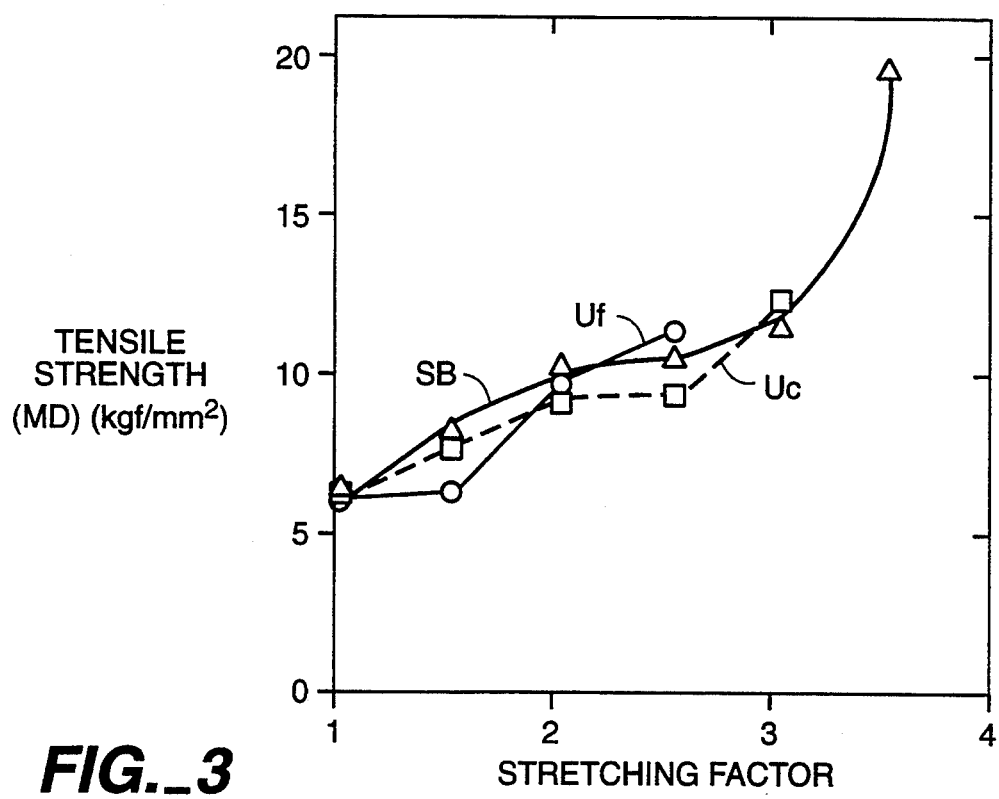
FIG._3
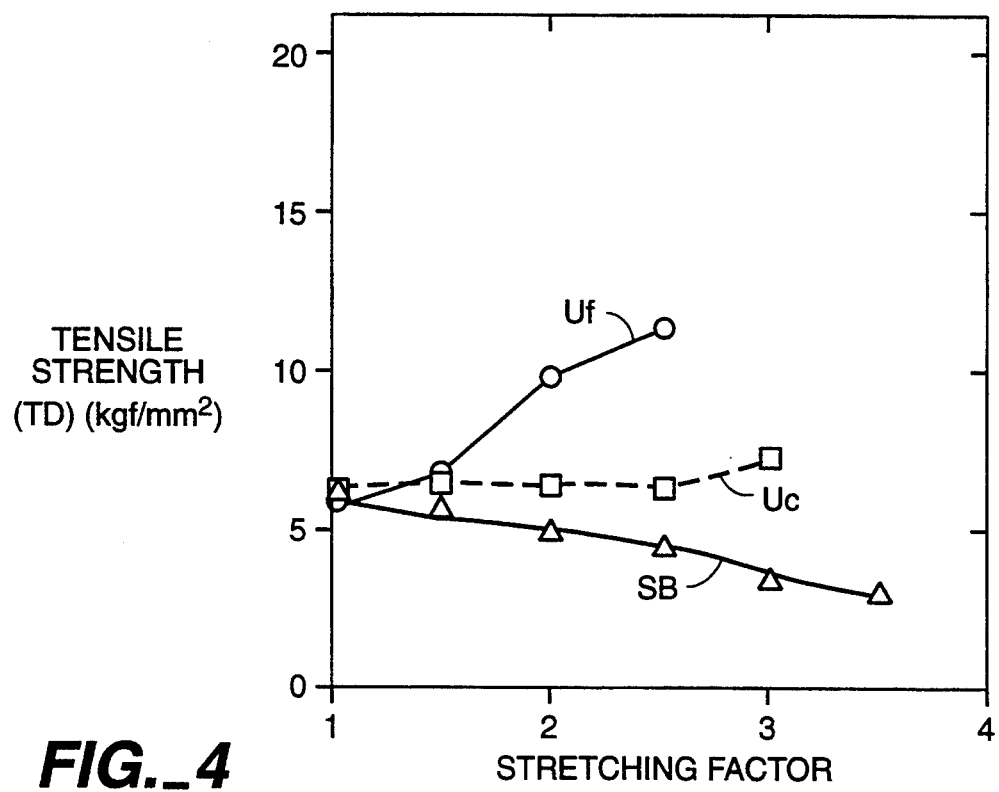
FIG._4

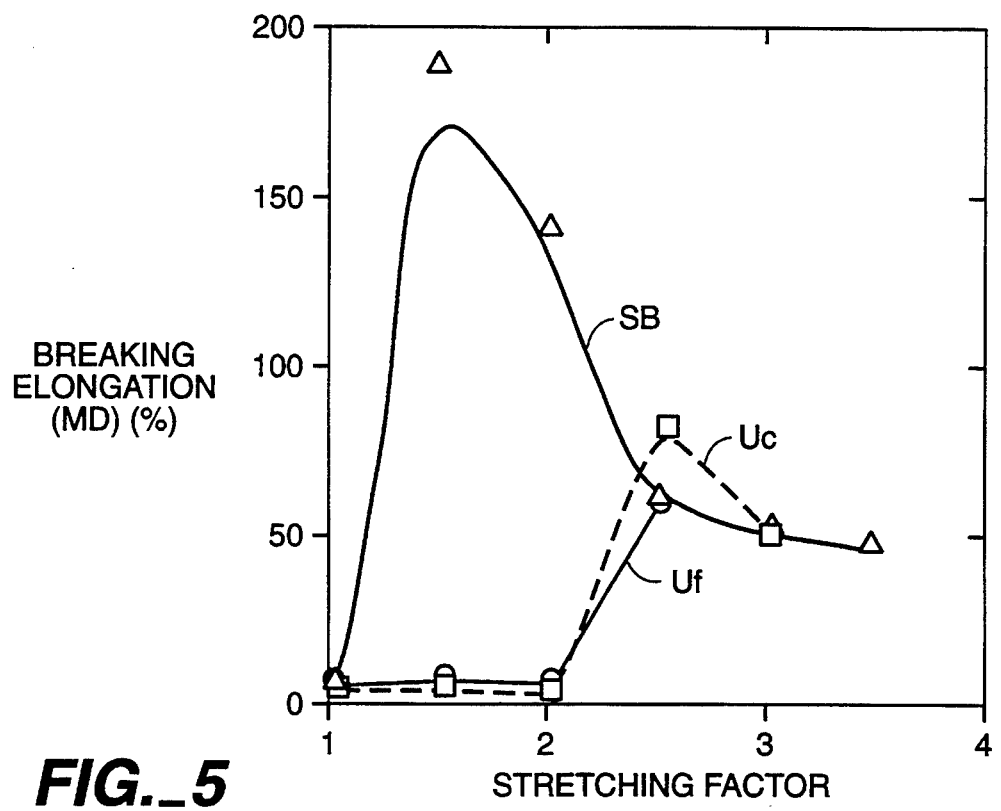
FIG._5
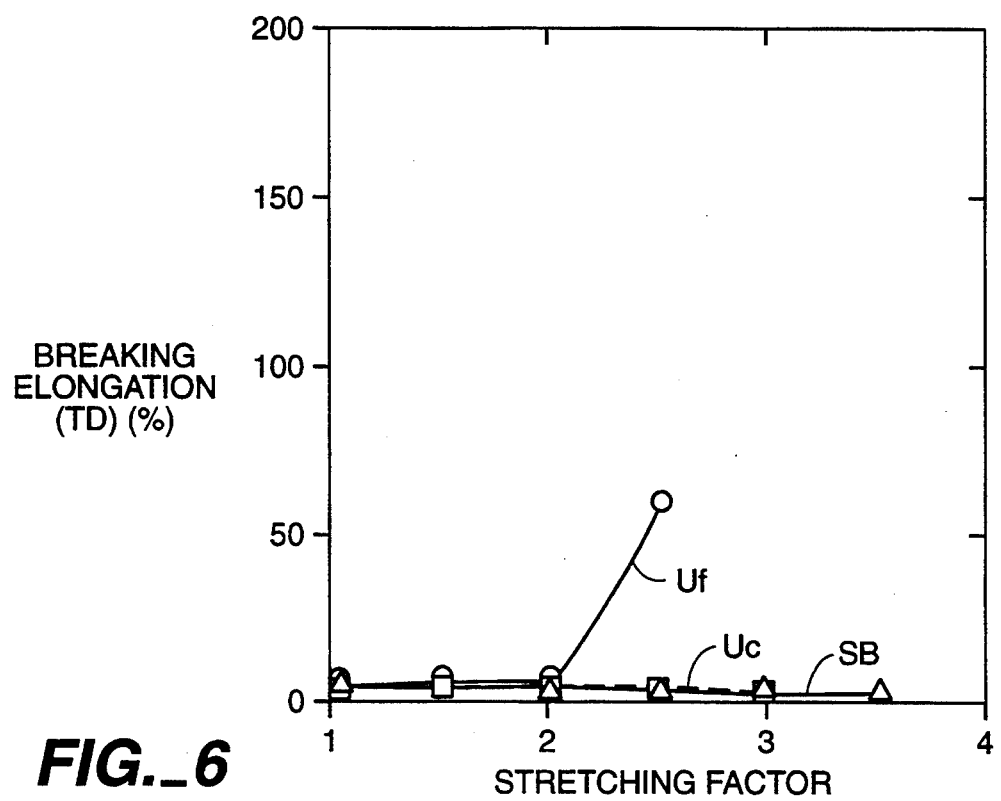
FIG._6

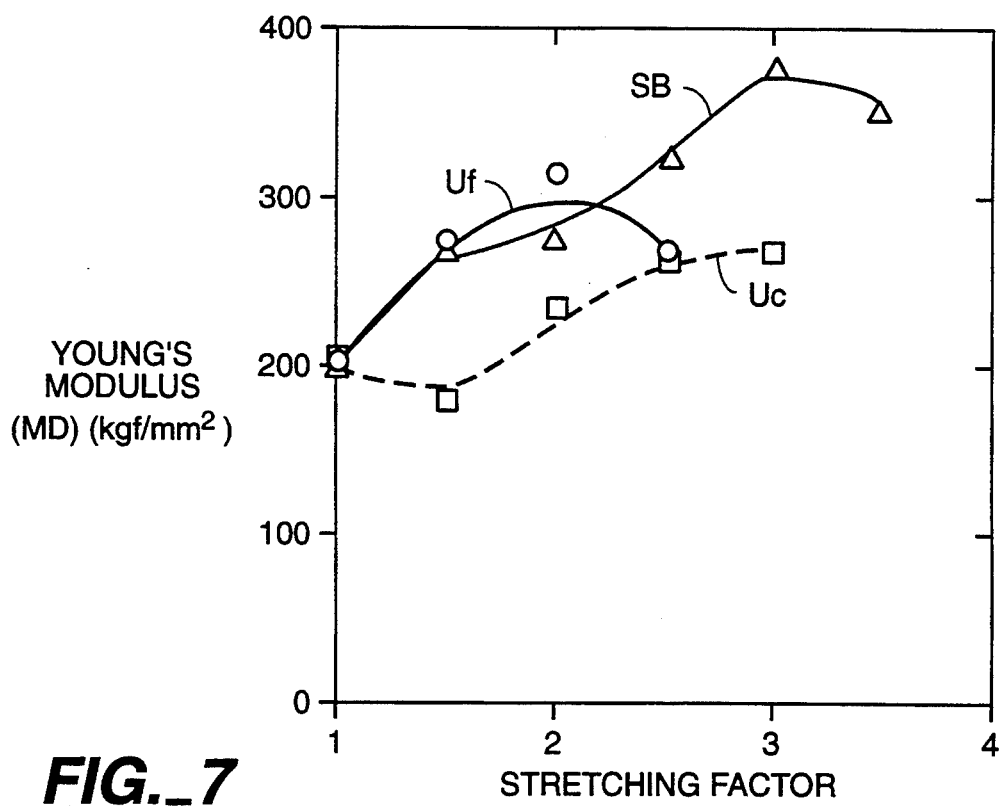
FIG._7
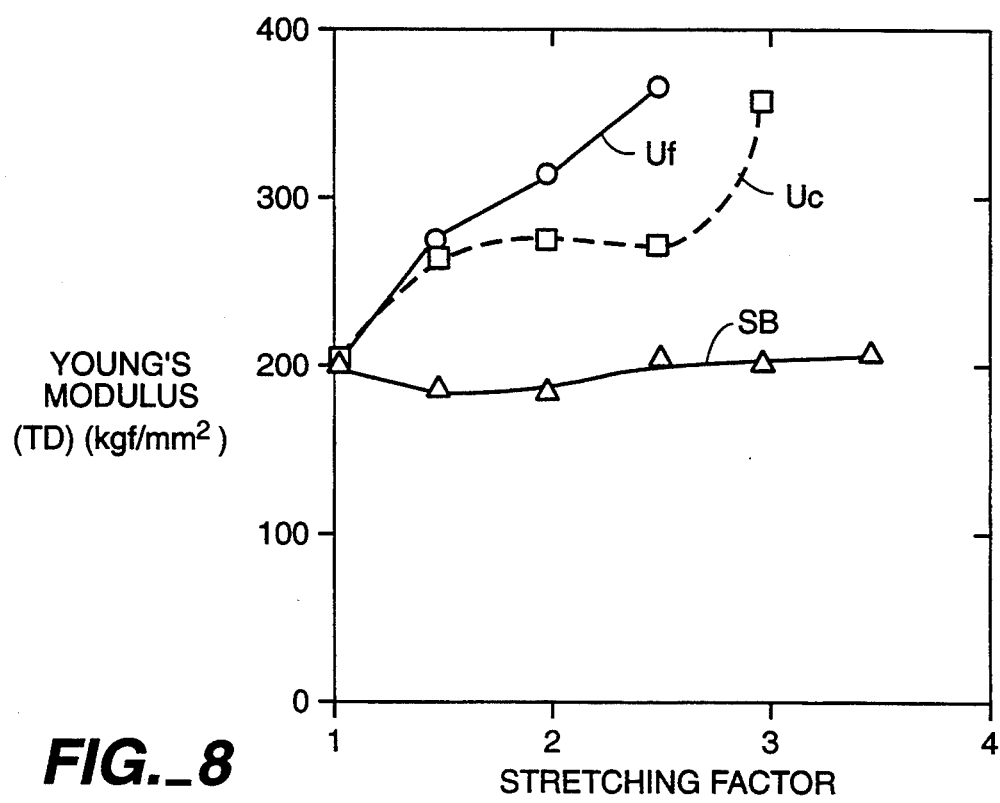
FIG._8

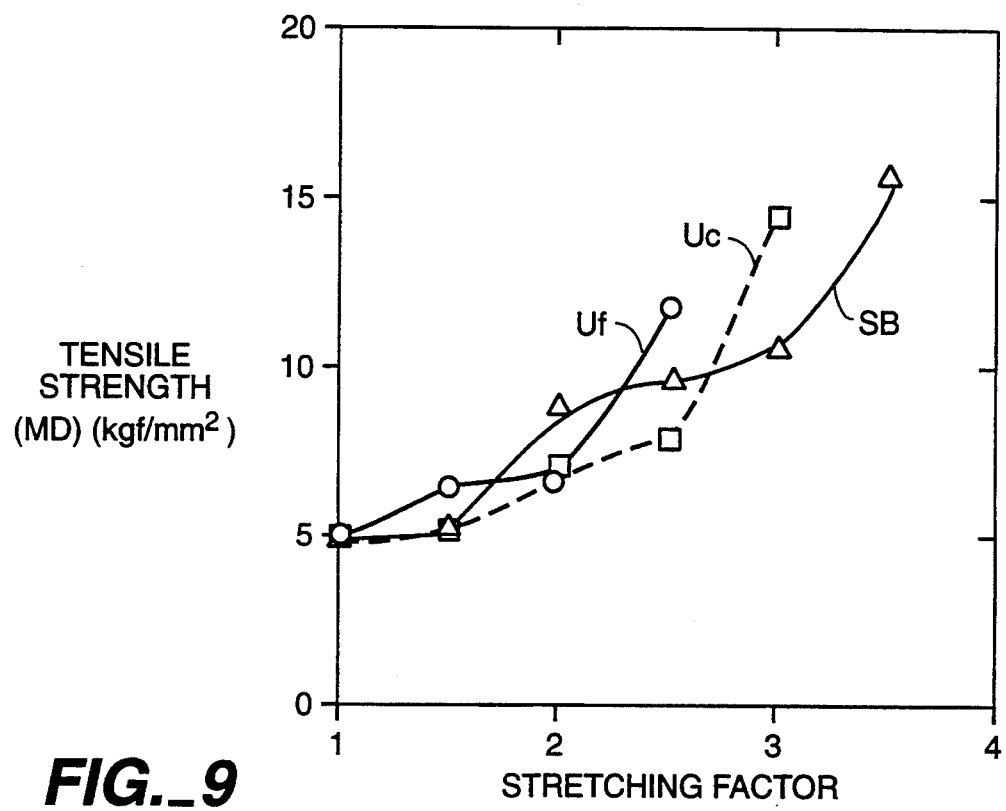
FIG._9
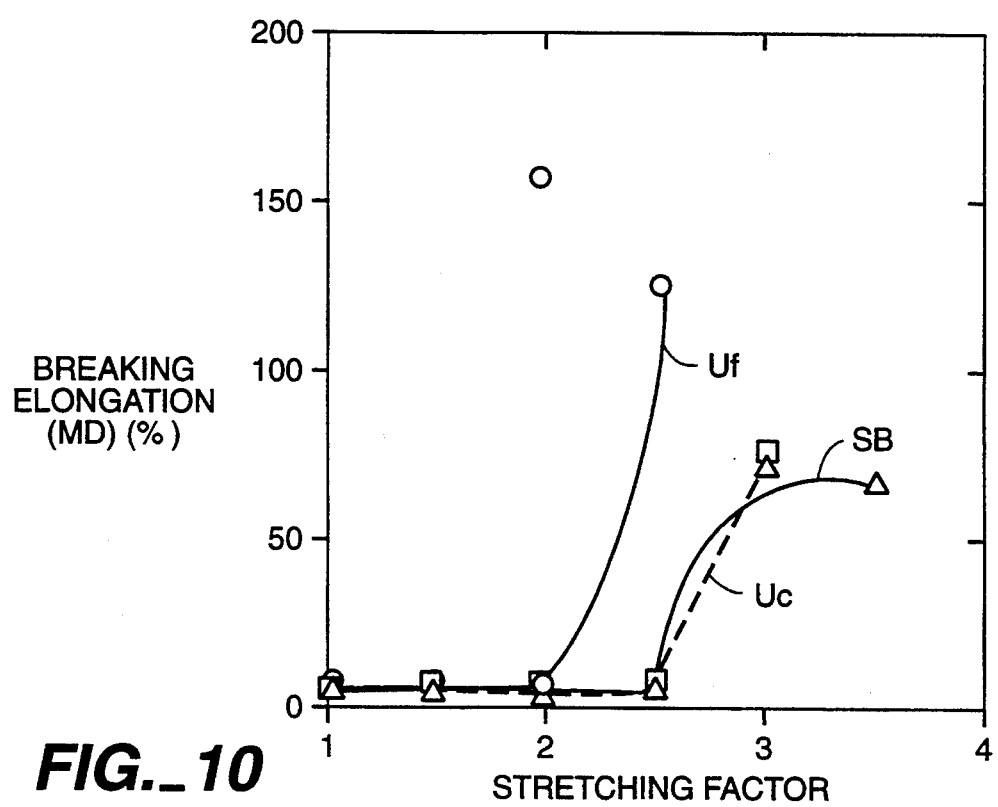
FIG._10

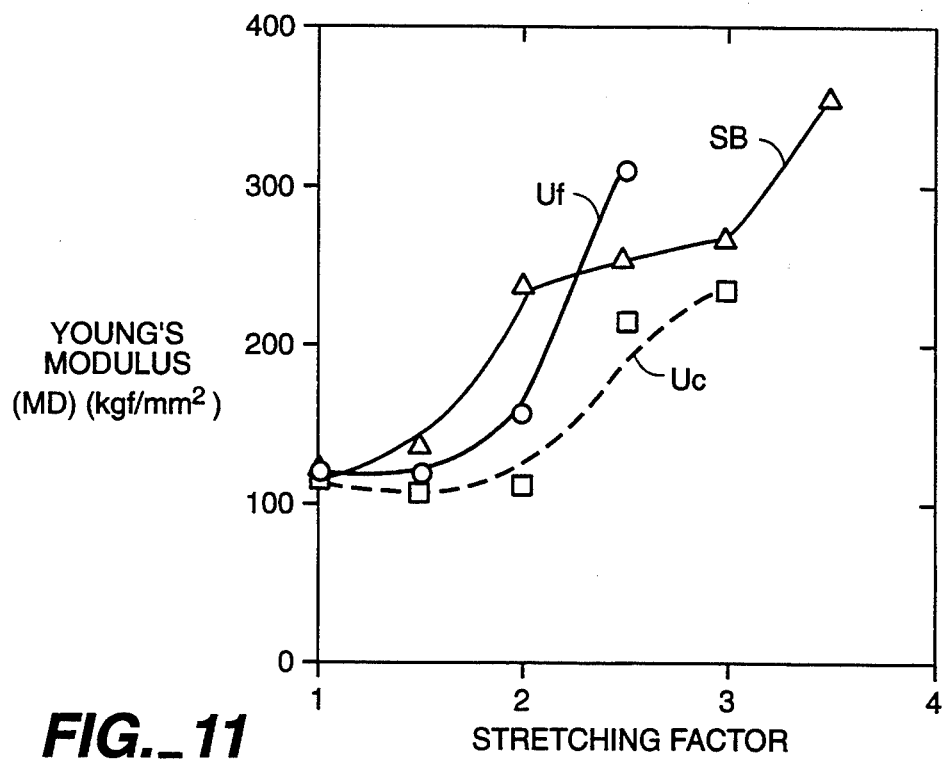
FIG._11
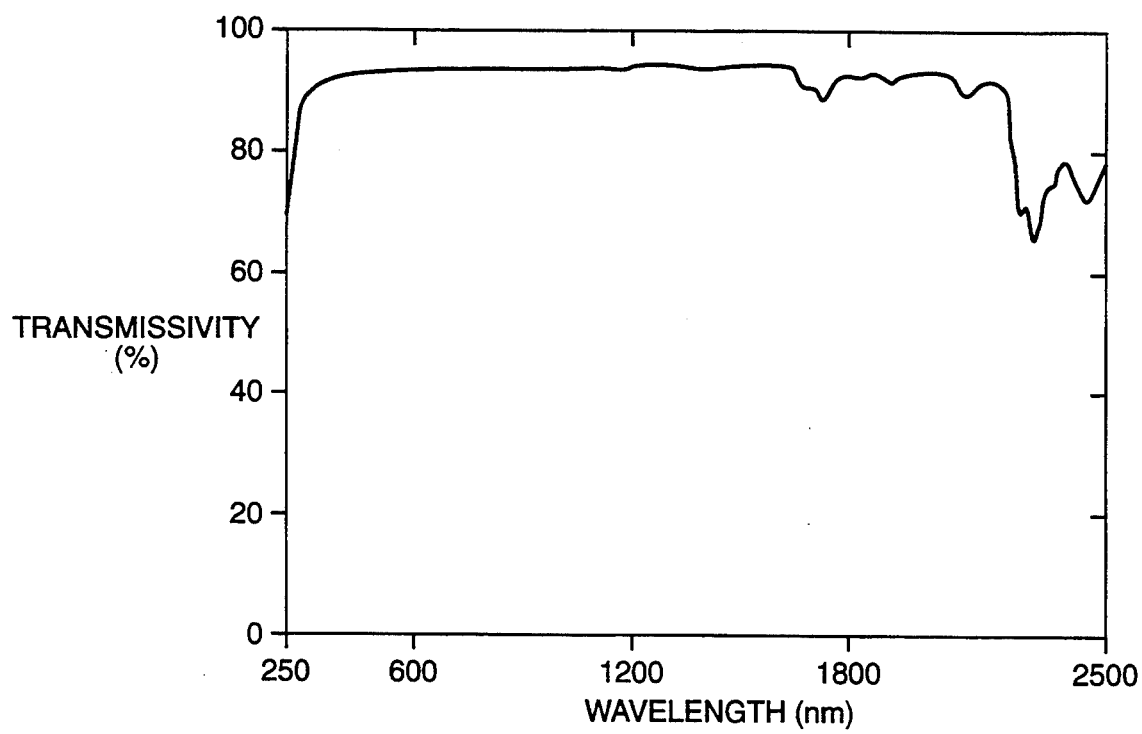
FIG._12

ORIENTED FILMS OF POLYLACTIC ACID AND METHODS OF PRODUCING SAME

BACKGROUND OF THE INVENTION

This invention relates to methods of producing oriented films of poly-L-lactic acid and/or poly-D-lactic acid, as well as to oriented films thus produced.

Poly-L-lactic acid and poly-D-lactic acid are aliphatic polyesters and are considered useful biodegradable materials because of their hydrolytic property. Although they are known materials, the technology of making them into a film has not been established yet because of their crystallizing property and rigidity. In general, when a polymeric material is stretched, its molecular chains and crystallites become oriented in the direction of the stretching such that its mechanical strength is improved and changes occur in its physical properties. Thus, it may be expected with poly-L-lactic acid and poly-D-lactic acid, too, that improvement in mechanical strength and changes in physical properties will result if they are subjected to a stretching process. Polylactic acids, and poly-L-lactic acids in particular, however, have a rigid molecular structure providing them with a high crystalline, and it has been difficult to improve their physical properties by stretching.

SUMMARY OF THE INVENTION

It is therefore an object of the invention to provide oriented films of poly-L-lactic acid and/or poly-D-lactic acid which can be drawn easily.

It is another object of the invention to provide methods of producing such oriented films of poly-L-lactic acid and/or poly-D-lactic acid.

A method according to a first embodiment of the invention, by which the above and other objects can be accomplished, may be characterized by the steps of melting and extruding polylactic acid to form a film and, after it is cooled rapidly, carrying out a uniaxial stretching or a simultaneous biaxial stretching at a temperature above the glass transition temperature and below the cold-crystallization temperature. The stretching process becomes easier to carry out by this method because the polymer chains having a rigid polymeric structure become easily oriented as the polymers are first reduced into an amorphous state and then subjected to a thermal stretching process. The step of rapid cooling may be effected by air, by water or by any other method.

Another method according to a second embodiment of the invention may be characterized by the steps of melting and extruding polylactic acid to form a film and, after it is cooled rapidly and drawn at a temperature above the glass transition temperature and below the cold-crystallization temperature, subjecting it to a thermal treatment. The tensile strength of the film can be improved further by this method because the thermal treatment (or preferably a thermal fixation process) contributes to the stabilization of the molecular structure of the polymer and an increase in the rate of crystallization.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a graph of a DSC thermal analysis on a film according to the first embodiment of the invention after the step of rapid cooling;

FIG. 2 is a graph of a DSC thermal analysis on a comparison film obtained by a casting method;

FIG. 3 is a graph of tensile strength of an oriented film according to the first embodiment of the invention in the stretching direction;

FIG. 4 is a graph of tensile strength of an oriented film according to the first embodiment of the invention in a direction perpendicular to the stretching direction;

FIG. 5 is a graph of the breaking elongation of an oriented film according to the first embodiment of the invention in the stretching direction;

FIG. 6 is a graph of the breaking elongation of an oriented film according to the first embodiment of the invention in a direction perpendicular to the stretching direction;

FIG. 7 is a graph of the Young's modulus of an oriented film according to the first embodiment of the invention in the stretching direction;

FIG. 8 is a graph of the Young's modulus of an oriented film according to the first embodiment of the invention in a direction perpendicular to the stretching direction;

FIG. 9 is a graph of the tensile strength of an oriented film according to the second embodiment of the invention in the stretching direction;

FIG. 10 is a graph of the tensile strength of an oriented film according to the second embodiment of the invention in a direction perpendicular to the stretching direction;

FIG. 11 is a graph of the breaking elongation of an oriented film according to the second embodiment of the invention in the stretching direction; and FIG. 12 is a graph of optical transmissivity of a film according to the first embodiment of the invention.

DETAILED DESCRIPTION OF PREFERRED EMBODIMENTS

Polymers to be used according to the present invention include poly-L-lactic acids and poly-D-lactic acids. Even poly-L-lactic acids having more rigid molecular structures can be used. The numerical average molecular weight of the polymers to be used is greater than 10,000, and preferably greater than 50,000.

The step of cooling rapidly according to the present invention is down to a temperature below 52° C., and preferably to a room temperature of about 20°–30° C. within about one minute. The stretching temperature should be preferably about 53°–103° C., or more preferably 55°–80° C. The temperature of the thermal treatment according to the present invention after the stretching process should be above the cold-crystallization temperature (103.1° C.) and below 160° C., or more preferably in the range of 105°–140° C. The preferred time of the thermal treatment is 1–60 minutes, and more preferably about 5–30 minutes.

Physical properties of preferred oriented films of polylactic acid obtained by a method according to the first embodiment of the invention described above are as follows:

(1) Tensile strength over 6 kgf/mm$^2$ in the stretching direction;

(2) Young's modulus over 220 kgf/mm$^2$ in the stretching direction;

(3) Transparency to visible light over 90% and preferably over 95%.

Physical properties of preferred oriented films of polylactic acid obtained by a method according to the second embodiment of the invention described above are as follows:

(1) Tensile strength over 7 kgf/mm² in the stretching direction;
(2) Young's modulus over 120 kgf/mm² in the stretching direction;
(3) Transparency to visible light over 90% and preferably over 93%.

The invention will be described next by way of test examples.

Test 1

Poly-L-lactic acid of numerical average molecular weight about 200,000 was melted at 210° C., extruded from a nozzle for a rolling process (at pressure of 200 kgf/mm² to thickness of 100–200 μm), and then cooled rapidly to a room temperature of about 28° C. The result of a DSC (differential scanning calorimeter) thermal analysis on what was obtained is shown in FIG. 1. For comparison, the same polymer was dissolved in a solvent, and the solvent was subsequently evaporated on a glass plate to obtain a film by a cast-molding method. The result of a similar DSC thermal analysis thereon is shown in FIG. 2 for comparison. FIG. 1 clearly shows that the polymer was in an amorphous state after it was cooled rapidly.

Next, the polymer thus cooled rapidly was stretched under the following conditions by using a hot-air circulating dry film-stretching apparatus:

(1) Speed of stretching: 100%/min;
(2) Preheating time: 10 min;
(3) Stretching temperature: 60° C.;
(4) Stretching ratio:
  (a) 3.5 times (in one direction) by uniaxial stretching with free width (Uf);
  (b) 3.0×1.0 times (in one direction) by uniaxial stretching with constant width (Uc);
  (c) 2.5×2.5 times (in two directions) by simultaneous biaxial stretching (SB).

FIGS. 3–8 show the physical properties of the films thus obtained. In these figures, MD indicates the direction of pulling at the time of the stretching process and TD indicates a direction perpendicular to the direction of the pulling at the time of the stretching. FIG. 12 shows the optical transmissivity of the oriented film thus obtained. It is clearly seen that the optical transmissivity was about 94% in the visible range.

In summary, it is possible to obtain films with tensile strength greater than 7 kgf/mm² in the direction of the stretching and Young's modulus greater than 220 kgf/mm² in the stretching direction, having optical transmissivity as good as about 93–94% in the visible range.

Test 2

Each of the drawn (oriented) films obtained in Test 1 was subjected to a thermal fixation treatment by fastening it on a glass plate by means of an adhesive tape, sandwiching it by placing another glass plate thereon, and subjecting it to a thermal treatment inside an isothermal container at 110° C. for a period of 30 minutes. The results of this test are shown in FIGS. 9–11. FIGS. 3, 4 and 5 relate to films before the heat treatment and FIGS. 9, 10 and 11 respectively relate to the same films after the thermal treatment. It was observed that the degree of crystallization after the thermal treatment was about 60%, independent of the stretching direction or the elongation. An improvement in tensile strength was also observed by the thermal treatment.

As explained above, a stretching process can be carried out with improved ease if polylactic acid is melted and extruded to form a film and, after it is cooled rapidly, subjected to a uniaxial stretching at constant width, a successive biaxial drawing or a simultaneous biaxial stretching at a temperature higher than the glass transition temperature and lower than the cold-crystallization temperature. The tensile strength of such films can be improved further if they are subjected to a thermal treatment after the stretching process.

What is claimed is:

1. A method of producing an oriented polylactic acid film, said method comprising the steps of:
   melting polylactic acid;
   extruding melted polylactic acid;
   forming a film from said extruded polylactic acid;
   cooling said film rapidly; and
   thereafter subjecting said rapidly cooled film to a stretching process selected from the group of processes consisting of uniaxial stretching with constant width, successive biaxial stretching and simultaneous biaxial stretching, at a temperature above the glass transition temperature and below the crystallization temperature.

2. The method of claim 1 whereby said stretched film has tensile strength over 6 kgf/mm² in the stretching direction in said stretching step, Young's modulus over 220 kgf/mm² in the stretching direction in said stretching step and transparency to visible light over 90%.

3. The method of claim 1 wherein said film is cooled at least to 52° C. within about one minute in said cooling step.

4. The method of claim 1 wherein said film is cooled to about 20°–35° C. within about one minute in said cooling step.

5. The method of claim 1 wherein the numerical average molecular weight of said lactic acid is greater than 10,000.

6. The method of claim 1 wherein said stretching process is carried out at temperature of 53°–103° C.

7. The method of claim 1 wherein said stretching process is carried out at temperature of 55°–80° C.

8. A method of producing an oriented polylactic acid film, said method comprising the steps of:
   melting polylactic acid;
   extruding melted polylactic acid;
   forming a film from said extruded polylactic acid;
   cooling said film rapidly; and
   thereafter stretching said rapid cooled film at a temperature above the glass transition temperature and below the crystallization temperature; and
   thereafter subjecting said stretched film to a thermal treatment.

9. The method of claim 8 whereby said thermally processed film has tensile strength over 7 kgf/mm² in the direction of stretching in said stretching step, Young's modulus over 120 kgf/mm² in the stretching direction in said stretching step, and transparency to visible light over 90%.

10. The method of claim 8 wherein said thermal treatment is carried out at 53°–103° C.

11. The method of claim 8 wherein said thermal treatment is carried out for 1–60 minutes.

12. The method of claim 8 wherein said thermal treatment is carried out at 55°-80° C. for 5-30 minutes.

13. The method of claim 8 wherein said film is cooled at least to 52° C. in said cooling step.

14. The method of claim 8 wherein said film is cooled to about 20°-35° C. in said cooling step.

15. The method of claim 8 wherein the numerical average molecular weight of said lactic acid is greater than 10,000.

16. The method of claim 8 wherein said stretching process is carried out at temperature of 53°-103° C.

17. The method of claim 8 wherein said stretching process is carried out at temperature of 55°-80° C.

* * * * *